US012761790B2

(12) United States Patent
Zuo et al.

(10) Patent No.: US 12,761,790 B2
(45) Date of Patent: Oct. 13, 2026

(54) DATA MANAGEMENT METHOD AND STORAGE DEVICE

(71) Applicant: Hefei Kaimeng Technology Co., Ltd., Anhui (CN)

(72) Inventors: Tao Tao Zuo, Anhui (CN); Kaidi Zhu, Anhui (CN); Zhi Wang, Anhui (CN); Tsung-Lin Wu, Anhui (CN); Qiao Zhu, Anhui (CN)

(73) Assignee: Hefei Kaimeng Technology Co., Ltd., Anhui (CN)

( * ) Notice: Subject to any disclaimer, the term of this patent is extended or adjusted under 35 U.S.C. 154(b) by 0 days.

(21) Appl. No.: 19/026,630

(22) Filed: Jan. 17, 2025

(65) Prior Publication Data

US 2025/0383767 A1 Dec. 18, 2025

(30) Foreign Application Priority Data

Jun. 14, 2024 (CN) ......................... 202410764362.1

(51) Int. Cl.
*G06F 3/06* (2006.01)

(52) U.S. Cl.
CPC .......... *G06F 3/0608* (2013.01); *G06F 3/0659* (2013.01); *G06F 3/0679* (2013.01)

(58) Field of Classification Search
CPC .... G06F 3/0608; G06F 3/0659; G06F 3/0679; G06F 3/0607; G06F 3/064; G06F 3/0647; G06F 3/065; G06F 3/0652; G06F 3/0658
USPC .......................................................... 711/154
See application file for complete search history.

(56) References Cited

U.S. PATENT DOCUMENTS 12,360,704 B1 * 7/2025 Alkalay ................ G06F 3/0652
2024/0192868 A1 * 6/2024 Yeh ..................... G06F 12/0246

* cited by examiner

*Primary Examiner* — Hua J Song
(74) *Attorney, Agent, or Firm* — JCIPRNET

(57) ABSTRACT

The invention provides a data management method and a storage device. The method is used in a host system and includes: sending a preparatory host data consolidation command to the storage device when a number of free physical units of the storage device is less than a predetermined threshold; receiving a mapping table sent by the storage device, the mapping table indicating a source physical unit for a host data consolidation process; issuing a corresponding programming command to the storage device according to an attribute of valid data in the source physical unit to reduce the valid data in the source physical unit, and thereby updating the mapping table; and transmitting the updated mapping table to the storage device for executing a device data consolidation process.

18 Claims, 9 Drawing Sheets

400

| Logical address | Physical address |
|---|---|
| L50 | P0 |
| L51 | P1 |
| L52 | P2 |
| L59 | P9 |
| L60 | P10 |
| L23 | P22 |
| L24 | P23 |
| L112 | P32 |
| L113 | P33 |
| L114 | P34 |

FIG. 4

400

| Group | Logical address | Physical address |
|---|---|---|
| 803 | L50 | P0 |
| 803 | L51 | P1 |
| 803 | L52 | P2 |
| 803 | L59 | P9 |
| 803 | L60 | P10 |
| 802 | L23 | P22 |
| 802 | L24 | P23 |
| 801 | L112 | P32 |
| 801 | L113 | P33 |
| 801 | L114 | P34 |

FIG. 8

DATA MANAGEMENT METHOD AND STORAGE DEVICE

CROSS-REFERENCE TO RELATED APPLICATION

This application claims the priority benefit of China application serial no. 202410764362.1 filed on Jun. 14, 2024. The entirety of the above-mentioned patent application is hereby incorporated by reference herein and made a part of this specification.

BACKGROUND OF THE INVENTION

Field of the Invention

The invention relates to a memory management technique, and in particular to a data management method and a storage device.

Description of Related Art

Non-volatile memory modules (e.g., flash memory modules) have advantages such as non-volatile data storage, low power consumption, and fast data access. In general, some spare physical units are configured by default in a non-volatile memory module to receive and store data from a host system. However, during the process of writing data into the non-volatile memory module, the number of spare physical units is gradually decreased. To prevent the number of spare physical units from being reduced to zero, garbage collection is generally performed in the background during the storage of data from the host system to release new spare physical units for subsequent use. The existing garbage collection is performed on the device end. This method does not take into account the efficiency and the performance of the host system, nor does it take into account the load of the device end and the issue of excessive write amplification factor.

SUMMARY OF THE INVENTION

The invention provides a data management method and a storage device that may cooperate with a host system to execute a data consolidation process, reduce the load of the device, and reduce the write amplification factor. An embodiment of the invention provides a data management method for a host system. The host system is electrically connected to the storage device, the storage device includes a memory module, and the memory module includes a plurality of physical units. The data management method includes: sending a preparatory host data consolidation command to the storage device when a number of free physical units of the storage device is less than a predetermined threshold; receiving a mapping table sent by the storage device, the mapping table indicating source physical units for a host data consolidation process; issuing a corresponding programming command to the storage device according to an attribute of valid data in the source physical units to reduce the valid data in the source physical unit, and thereby updating the mapping table to obtain a second mapping table; and transmitting the second mapping table to the storage device for executing a device data consolidation process.

From another perspective, an embodiment of the invention provides a data management method for a storage device, wherein the storage device includes a memory module, and the memory module includes a plurality of physical units. The data management method includes: selecting source physicals unit in a plurality of physical units in response to a preparatory host data consolidation command of a host system; searching a mapping table according to physical addresses of the source physical units, and transmitting the mapping table corresponding to the source physical unit to the host system to execute a host data consolidation process; performing a corresponding programming operation on data corresponding to a programming command in response to the programming command from the host system; and executing a device data consolidation process according to an updated mapping table after receiving the updated mapping table sent by the host system.

From another perspective, an embodiment of the invention provides a storage device including a connecting interface unit, a memory module, and a memory controller. The connecting interface unit is used for connecting to a host system. The memory module includes a plurality of physical units. The memory controller is connected to the connecting interface unit and the memory module to perform a plurality of steps: selecting source physical units in a plurality of physical units in response to a preparatory host data consolidation command of a host system; searching a mapping table according to physical addresses of the source physical unit, and transmitting the mapping table corresponding to the source physical unit to the host system to execute a host data consolidation process; performing a corresponding programming operation on data corresponding to a programming command in response to the programming command from the host system; and executing a device data consolidation process according to an updated mapping table after receiving the updated mapping table sent by the host system.

BRIEF DESCRIPTION OF THE DRAWINGS

FIG. 4 shows a schematic diagram of a mapping table according to an embodiment.

FIG. 8 shows a schematic diagram of an updated mapping table according to an embodiment.

DESCRIPTION OF THE EMBODIMENTS

Figure 1:
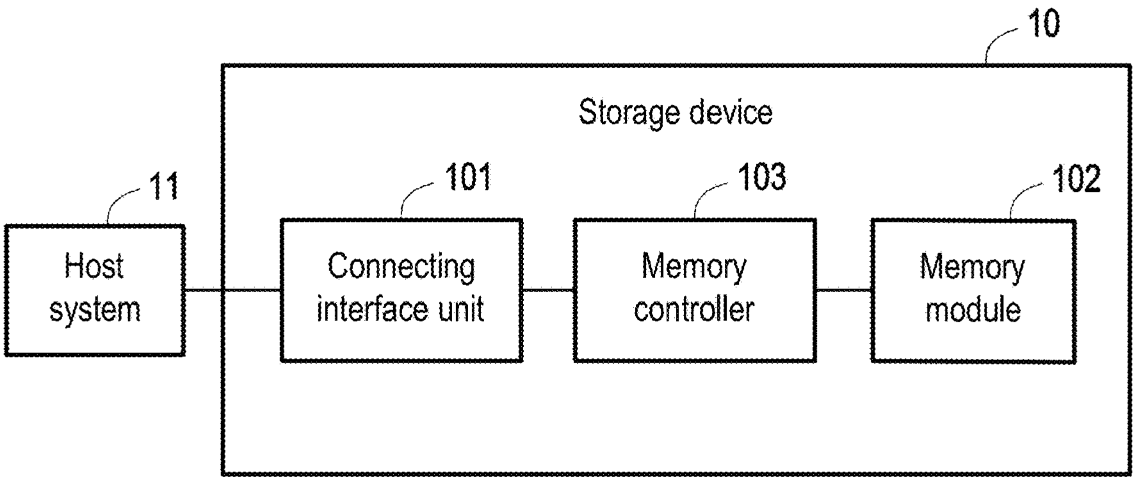
FIG. 1 is a schematic diagram of a storage device shown according to an embodiment of the invention.

Reference will now be made in detail to the exemplary embodiments of the disclosure, examples of which are illustrated in the accompanying drawings. Wherever possible, the same reference numerals are used in the drawings and descriptions to refer to the same or like parts.

FIG. 1 is a schematic diagram of a storage device shown according to an embodiment of the invention. Referring to FIG. 1, a data storage system includes a storage device 10 and a host system 11. The host system 11 may be any type of computer system, such as a smart phone, a tablet computer, a notebook computer, a desktop computer, an industrial computer, a game console, a server, or a vehicle-mounted computer, etc., and the type of the host system 11 is not limited thereto.

The storage device 10 is connected to the host system 11 and used to store data from the host system 11. For example, the storage device 10 may include a solid-state drive, a USB flash drive, a memory card, or other types of non-volatile storage devices. The host system 11 may be communicated with the storage device 10 via an embedded Multi-Media Card (eMMC), a universal flash storage (UFS), a fast peripheral component interconnect express (PCI Express), a fast non-volatile memory express (NVM express), a Serial Advanced Technology Attachment (SATA), a Universal Serial Bus (USB), or other types of connecting interface standards. Therefore, the host system 11 may store data to the storage device 10 and/or read data from the storage device 10.

The storage device 10 includes a connecting interface unit 101, a memory module 102, and a memory controller 103. The connecting interface unit 101 is used to connect the storage device 10 to the host system 11. For example, the connecting interface unit 101 may support a connecting interface standard such as eMMC, UFS, PCI Express, NVM express, SATA, PCI Express, or USB. The storage device 10 may be communicated (e.g., exchange a signal and/or data) with the host system 11 via the connecting interface unit 101.

The memory module 102 is used to store data. The memory module 102 may include one or a plurality of rewritable non-volatile memory modules. Each rewritable non-volatile memory module may include one or a plurality of memory cell arrays. The memory cells in the memory cell array store data in the form of voltage. For example, the memory module 102 may include a single-level cell (SLC) NAND flash memory module, a multi-level cell (MLC) NAND flash memory module, a triple-level cell (TLC) NAND flash memory module, a quad-level cell (QLC) NAND flash memory module, and/or other memory modules having the same or similar characteristics.

The memory controller 103 is connected to the connecting interface unit 101 and the memory module 102. The memory controller 103 may be regarded as a control core of the memory device 10 and is used to control the memory device 10. For example, the memory controller 103 may be responsible for controlling and/or managing the overall or partial operations of the memory device 10. For example, the memory controller 103 may include a central processing unit (CPU), or other programmable general-purpose or special-purpose microprocessors, digital signal processors (DSPs), programmable controllers, application-specific integrated circuits (ASICs), programmable logic devices (PLDs), or other similar devices, or a combination of these devices. In an embodiment, the memory controller 103 includes a flash memory controller.

In an embodiment, the memory controller 103 may further include a buffer memory, a power management circuit, an encoding circuit, a decoding circuit, and/or other types of various circuit modules, which are not limited in the invention. The buffer memory is used to cache data. The power management circuit is used to manage the power of the storage device 10. The encoding circuit is used to encode data to be stored in the memory module 102 to generate an error correction code (and/or an error checking code). The decoding circuit is used to decode the data read from the memory module 102 to correct possible errors in the read data. For example, the encoding circuit and/or the decoding circuit may adopt various encoding/decoding algorithms such as a low-density parity check code (LDPC code), a BCH code, a Reed-Solomon code (RS code), and an exclusive OR (XOR) code to encode and decode data.

The memory module 102 may receive a command sequence from the memory controller 103 and access a memory unit according to the command sequence. For example, when data is to be stored, the memory controller 103 may send a write command sequence to the memory module 102 to instruct the memory module 102 to store the data in a specific memory cell. When data is to be read, the memory controller 103 may send a read command sequence to the memory module 102 to instruct the memory module 102 to read data from a specific memory cell. When data is to be deleted, the memory controller 103 may send an erase command sequence to the memory module 102 to instruct the memory module 102 to erase the data stored in a specific memory unit. In addition, the memory controller 103 may also send other types of command sequences to the memory module 102 to instruct the memory module 102 to perform a corresponding operation, which is not limited in the invention.

Figure 2:
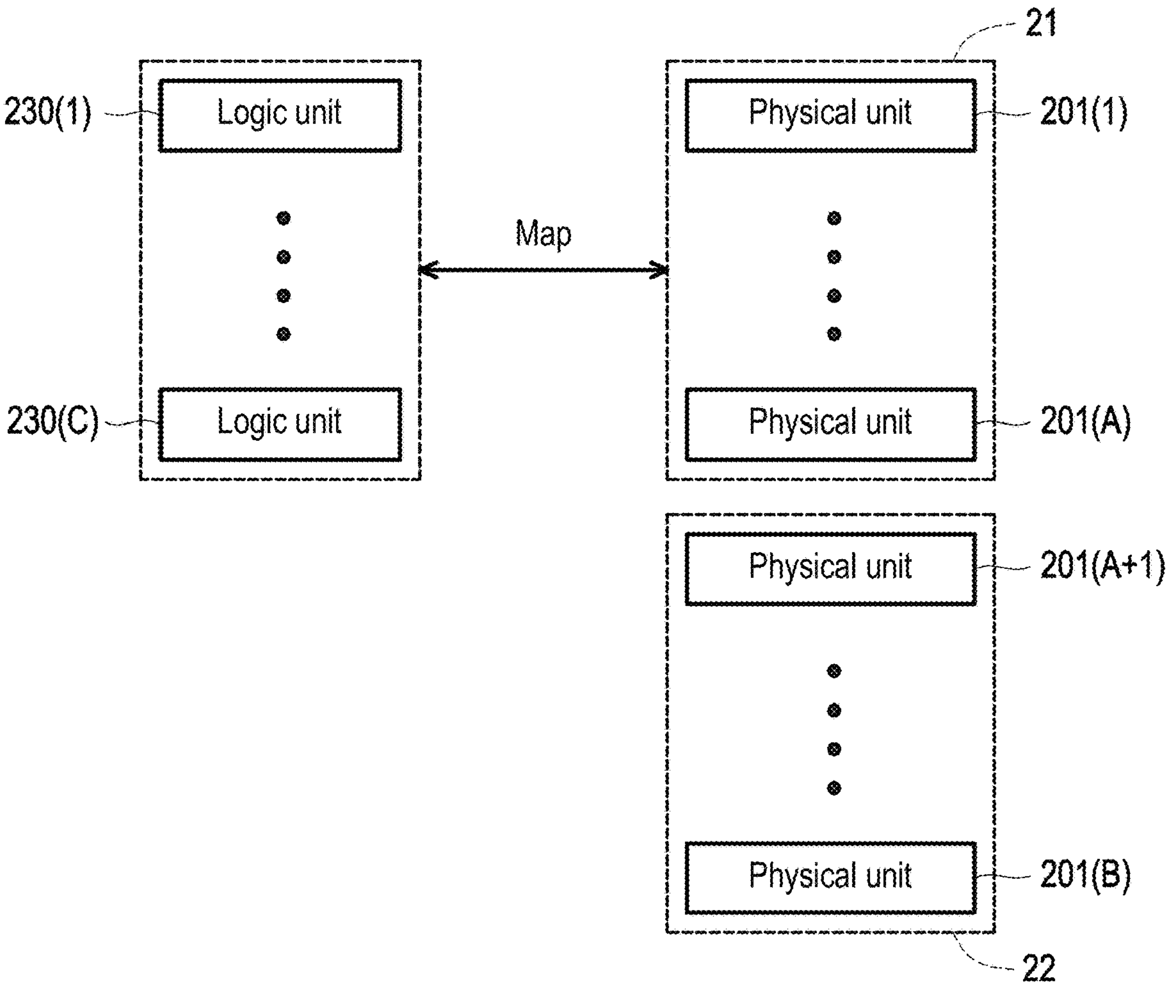
FIG. 2 is a schematic diagram of managing a memory module shown according to an embodiment of the invention.

FIG. 2 is a schematic diagram of managing a memory module shown according to an embodiment of the invention. Referring to FIG. 1 and FIG. 2, the memory module 102 includes a plurality of physical units 201(1) to 201(B). Each physical unit includes a plurality of storage units and is used for storing data in a non-volatile manner.

In an embodiment, one physical unit may include a plurality of physical sectors. For example, the data capacity of one physical sector may be 512 bytes (B), and one physical unit may include 8 physical sectors. However, the data capacity of one physical sector and/or the total number of physical sectors included in one physical unit may be adjusted according to practical needs, and the invention is not limited thereto. In an embodiment, one physical unit may be regarded as one physical page. For example, the data capacity of one physical page may be 4 kilobytes (4 KB), but the invention is not limited thereto.

In an embodiment, one physical page is the minimum unit of synchronously writing data in the memory module 102. For example, when a programming operation is performed on one physical page to write data into the physical page, a plurality of memory units in the physical page may be programmed synchronously to store corresponding data. For example, when programming one physical page, a write voltage may be applied to the physical page to change the threshold voltage of at least a portion of memory units in the physical page. The threshold voltage of each memory unit may reflect the bit data stored in the memory unit.

In an embodiment, the memory module 102 may include a plurality of physical blocks. Each physical block may include a plurality of physical units. In particular, a plurality of physical units (e.g., physical pages) in the same physical block may be erased simultaneously. For example, when erasing one physical block, an erase voltage may be applied to a plurality of physical pages in the physical block to change the threshold voltages of at least some of the memory units in the physical pages and clear the bit data stored in each of the memory units in the physical pages. In an embodiment, one physical unit may be regarded as one physical block.

In an embodiment, the memory controller 103 may logically associate physical units 201(1) to 201(A) to a data area 21 and associate physical units 201(A+1) to 201(B) to a spare area 22. The physical units 201(1) to 201(A) in the data area 21 are used to store data (also referred to as user data) from the host system 11. For example, each physical unit in the data area 21 may store valid data and/or invalid data. In addition, the physical units 201(A+1)-201(B) in the spare area 22 do not store data, and these physical units are also called free physical units.

In an embodiment, if a certain physical unit does not store valid data, the physical unit may be associated with the spare area 22. In an embodiment, the spare area 22 is also called a free pool. In addition, the physical unit associated with the spare area 22 may be erased to clear the data in the physical unit.

In an embodiment, when data (i.e., user data) from the host system 11 needs to be stored, the memory controller 103 may select one or a plurality of physical units from the spare area 22 and instruct the memory module 102 to store the data from the host system 11 into the selected physical unit. At the same time, the selected physical unit may be associated with the data area 21.

In an embodiment, the memory controller 103 may configure a plurality of logical units 230(1) to 230(C) to map the physical units 201(1) to 201(A) in the data area 21. For example, one logical unit may correspond to one logical block address (LBA) or other logical management units (such as one logical page). One logical unit may be mapped to one or a plurality of physical units in the data area 21.

In an embodiment, if a certain physical unit is currently mapped by any logical unit, the memory controller 103 may determine that the data currently stored in the physical unit includes valid data. On the contrary, if a certain physical unit is not currently mapped by any logical unit, the memory controller 103 may determine that the physical unit does not currently store any valid data (and/or the data in the physical unit are all invalid data).

In embodiment, the memory controller 103 may record the mapping relationship between the logical units and the physical units in a logical-to-physical mapping table. When receiving an access command (such as a read command, a write command, a delete command, or other types of commands) from the host system 11, the memory controller 103 may instruct the memory module 102 to perform corresponding operation behaviors according to the information in the logical-to-physical mapping table.

The memory controller 103 may execute one data consolidation process as needed. The data consolidation process is also called a garbage collection process. When executing the data consolidation process, the memory controller 103 may select at least one physical unit from the data area 21 as a source physical unit and select at least one physical unit from the spare area 22 as a target physical unit. The memory controller 103 may centrally copy the valid data stored in the source physical unit to the target physical unit. After the valid data stored in the source physical unit is copied to the target physical unit, all the data in the source physical unit is marked as invalid and the source physical unit may be divided into the spare area 22. In addition, the physical unit divided into the spare area 22 may be erased to clear the data stored in the physical unit. In an embodiment, the operation of re-dividing a certain physical unit from the data area 21 to the spare area 22 is also referred to as releasing one physical unit. That is, during the start of the data consolidation process, one or a plurality of physical units may be gradually released and the total number of physical units belonging to the spare area 22 may be gradually increased. In particular, in the present embodiment, the memory controller 103 cooperates with the host system 11 to execute the data consolidation process. The process executed by the memory controller 103 is called a device data consolidation process, and the process executed by the host system 11 is called a host data consolidation process.

Figure 3:
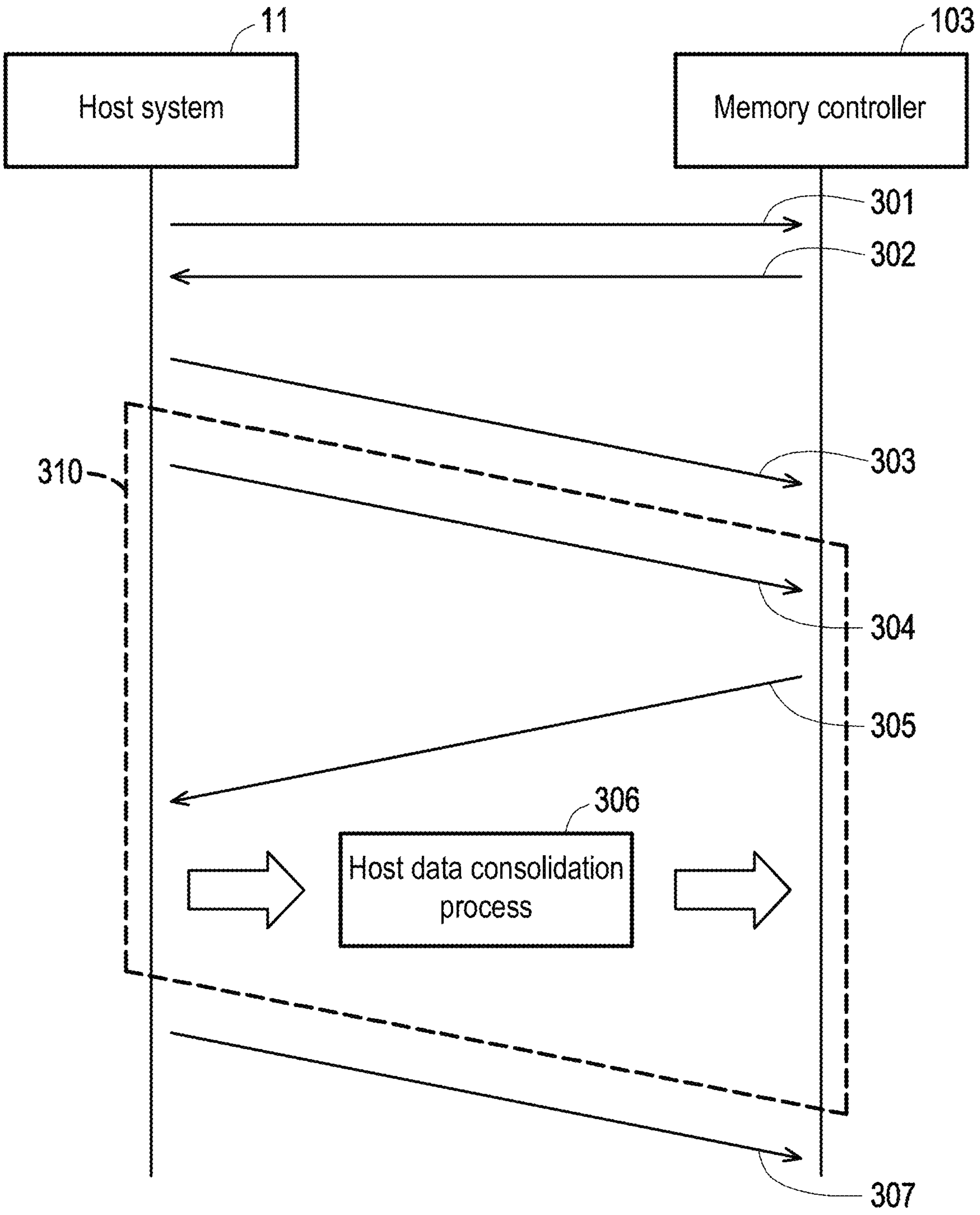
FIG. 3 shows a schematic diagram of communication between a host system and a storage device according to an embodiment.

FIG. 3 shows a schematic diagram of communication between a host system and a storage device according to an embodiment. In the following disclosure, describing the communication (e.g., transmitting data) between the host system 11 and the memory controller 103 is equivalent to describing the communication between the host system 11 and the storage device 10. In addition, describing the host system 11 as transmitting data to the memory controller 103 below is equivalent to the memory controller 103 receiving data from the host system 11.

First, in operation 301, the host system 11 sends a query command to the memory controller 103 at a default frequency to query the device status. In operation 302, in response to the query command, the memory controller 103 returns the device status to the host system 11. The device status includes, for example, information such as the number of free physical units in the spare area 22 and the number of valid data in the physical units in the data area 21. The host system 11 may determine whether to initiate a host data consolidation process according to the device status. For example, when the number of free physical units in the spare area 22 is less than one predetermined threshold, it is determined that the host data consolidation process may be executed. The host data consolidation process is to pre-organize the valid data to improve the efficiency of garbage collection at the device side. If the host data consolidation process and the device data consolidation process are performed simultaneously, the same data may be moved repeatedly or deleted immediately after being moved, resulting in a higher write amplification factor (WAF). Therefore, when the host system 11 determines that the host data consolidation process may be executed, the host system 11 issues a preparatory host data consolidation command to the memory controller 103 in operation 303. The object of the preparatory host data consolidation command is to restrict the memory controller 103 from starting the device data consolidation process. After receiving the preparatory host data consolidation command, the memory controller 103 does not start the device data consolidation process.

In addition, after receiving the preparatory host data consolidation command, the memory controller 103 selects a plurality of source physical units from the data area 21, for example, a physical unit having less valid data may be preferentially selected as a source physical unit. The memory controller 103 may determine the physical address of the physical unit according to the physical unit, query the logical address in the logical-physical mapping table according to the physical address, and obtain the mapping table corresponding to the source physical unit. FIG. 4 shows a schematic diagram of a mapping table according to an embodiment. Referring to FIG. 3 and FIG. 4, a mapping table 400 records the logical addresses of the logical units and the physical addresses of the corresponding physical units. In the example of FIG. 4, logical addresses are represented by symbols such as "L50" and "L51". These logical addresses are, for example, logical block addresses. Similarly, in FIG. 4, symbols such as "P0" and "P1" are used to represent physical addresses, and these physical addresses are, for example, physical block addresses (PBAs). In this example, the logical unit of address L50 is mapped to the physical unit of address P0, and so on.

In operation 304, the host system 11 may issue a request of a mapping table to the memory controller 103. In response to this request, at operation 305, the memory controller 103 transmits the mapping table 400 to the host system 11. The mapping table 400 indicates the source physical unit used for the host data consolidation process, including the mapping relationship between the physical address and the logical address of the source physical unit. Next, the host system 11 executes the host data consolidation process 306. In this process, the host system issues a programming command to the memory controller 103 according to the attribute of the valid data in the source physical unit to reduce the amount of the valid data in the source physical unit, and thereby updates the mapping table 400. The attribute of the valid data may include information such as the content of the valid data, whether the valid data is updated periodically, whether the valid data is about to be deleted, and whether the valid data is about to be updated. The host system 11 may perform flexible data management according to the attribute of the valid data. For example, when a piece of data is about to be updated, there is no need to execute the device data consolidation process. This may avoid duplicate data movement, or when a piece of data is about to be deleted, there is no need to perform the device data consolidation process. Since this information may only be obtained at the host system 11 end, inefficient data transfer may be reduced and the efficiency of the data consolidation process may be improved after being added to the collaborative operation of the host system 11.

Figure 5:
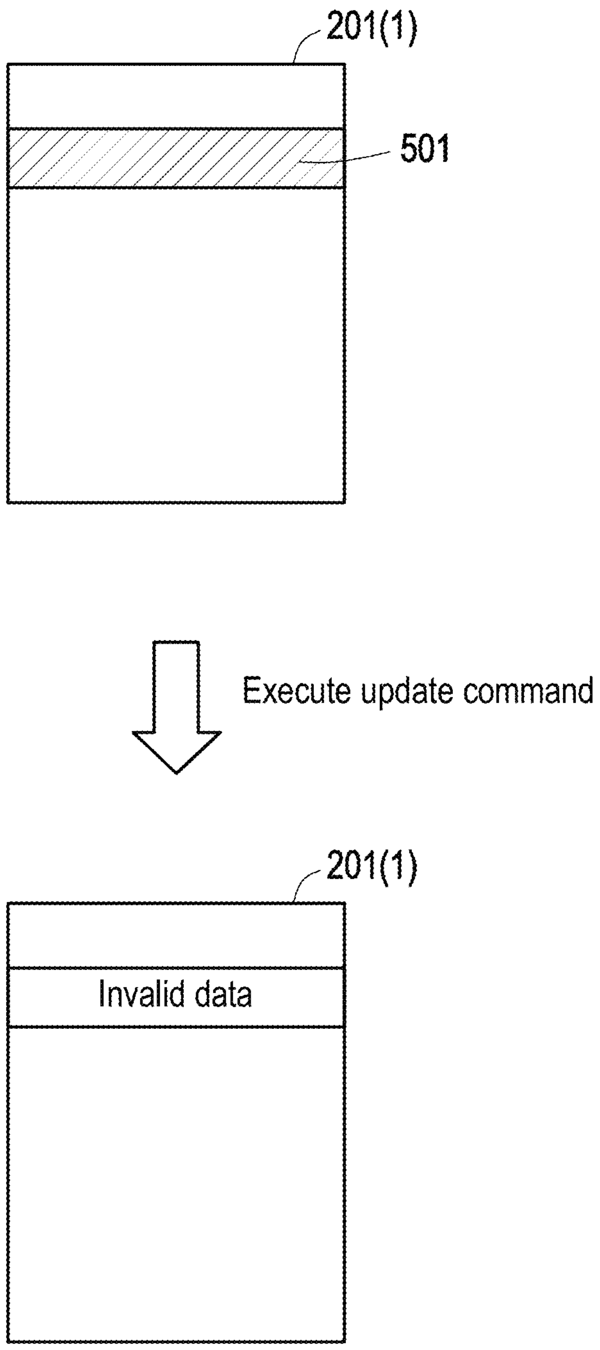
FIG. 5 shows a schematic diagram of a host system issuing an update command according to an embodiment.

For example, FIG. 5 shows a schematic diagram of a host system issuing an update command according to an embodiment. Referring to FIG. 5, it is assumed that the physical unit 201(1) is the selected source physical unit, wherein valid data 501 is stored. The host system 11 may know the logical unit mapped by the physical unit 201(1) from the above mapping table, and further may know properties such as the content of the valid data 501 and whether the valid data 501 is periodically updated data. For example, the valid data 501 stores data acquired by a sensor. The sensor acquires data again at regular intervals. Therefore, the host system 11 updates this data at regular intervals, and such data is called periodic update data. Whenever the sensor obtains new data, the host system 11 adds the corresponding update command to a schedule and issues the update command to the memory controller 103 according to the schedule. When the valid data 501 is periodically updated data, the host system 11 issues an update command in advance to update the valid data 501 (advancing the original schedule). The new data is stored in another physical unit, and the space originally used to store the valid data 501 is used to store invalid data, that is, the amount of valid data in the physical unit 201(1) is reduced. After the update command is executed, there is no valid data in the physical unit 201(1), so the physical unit 201(1) may be released.

Figure 6:
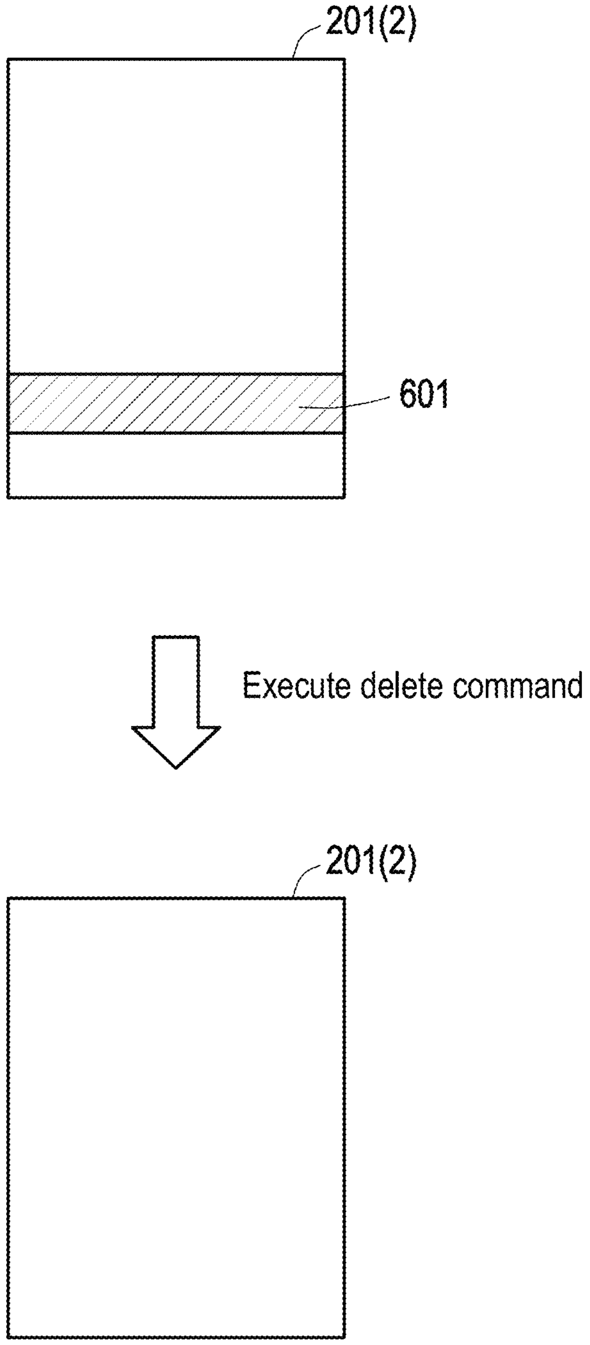
FIG. 6 shows a schematic diagram of a host system issuing a delete command according to an embodiment.

FIG. 6 shows a schematic diagram of a host system issuing a delete command according to an embodiment. Referring to FIG. 6, it is assumed that the physical unit 201(2) is the selected source physical unit, wherein valid data 601 is stored. The host system 11 may know the logical unit mapped by the physical unit 201(2) from the mapping table, and further may know properties such as the content of the valid data 601 and whether the valid data 601 is deletable data. For example, the valid data 601 is some temporary data about the system, but due to timeliness, the valid data 601 is no longer needed, that is, the valid data 601 is deletable data. When the valid data 601 is deletable data, the host system 11 issues a delete command to delete the valid data 601. After the delete command is executed, the physical unit 201(2) no longer stores valid data and may be released. Using such a delete command is equivalent to the host system 11 executing the host data consolidation process according to the attribute of the valid data 601. The advantage of the host system 11 issuing the delete command is to prevent the valid data 601 from being moved to other physical units due to the device data consolidation process before being deleted.

Figure 7:
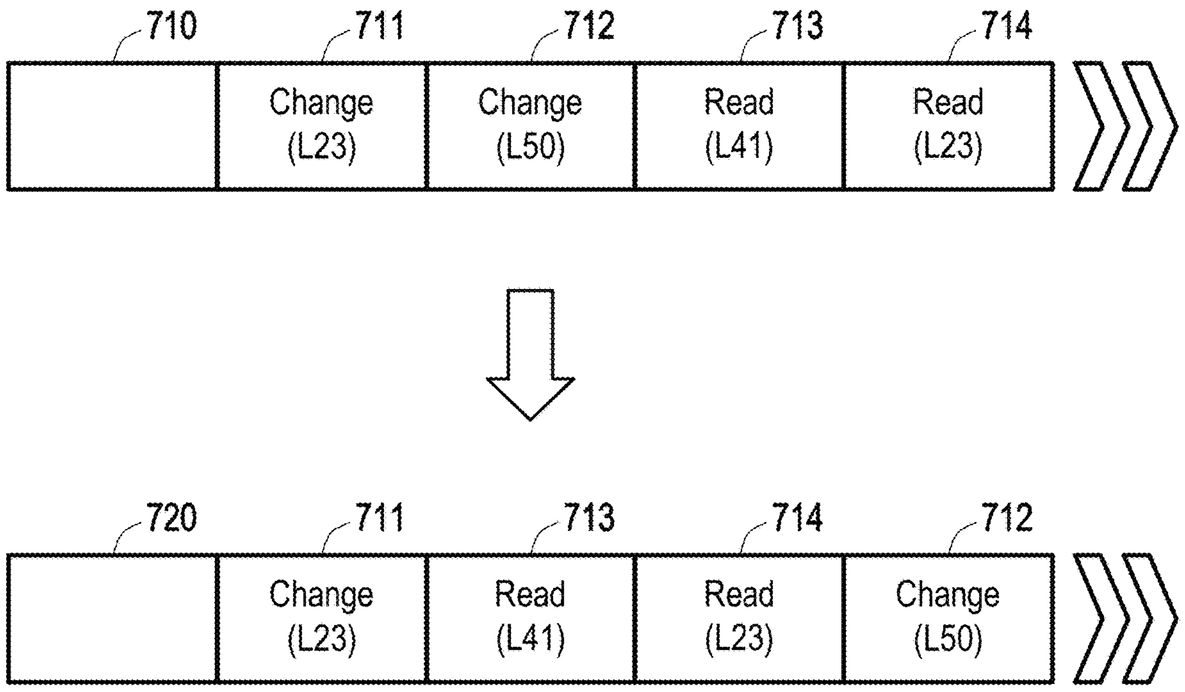
FIG. 7 shows a schematic diagram of a command queue according to an embodiment.

FIG. 7 shows a schematic diagram of a command queue according to an embodiment. Referring to FIG. 7, a command queue 710 is provided in the host system 11, including a plurality of commands 711 to 714 waiting to be executed. In FIG. 7, the commands at the right are executed first. That is, the command 714 is executed first, followed by the commands 713, 712, and 711 in sequence. The numbers in each command 711 to 714 in FIG. 7 refer to the corresponding logical address. For example, the command 714 is a read command for reading a logical unit having a logical address of "L23"; the command 713 is a read command used to read the logical unit having the logic address "L41"; the command 712 is a change command used to change the logical unit having the logic address "L50"; the command 714 is a change command used to change the logical unit having the logical address "L23". The change command includes an update command or a delete command used to update or delete the data stored in the corresponding logical unit.

Referring to FIG. 4 and FIG. 7, for the logical unit (also referred to as the first logical unit) recorded in the mapping table 400, the host system 11 determines whether the command queue 710 contains the change command of the first logical unit. If so, the change command may be executed in advance. Since the corresponding valid data is updated or deleted, there is a chance to release another physical unit. However, if there is a read command to be executed before the change command, the change command may not be executed early, thus affecting the result of the read command. For example, the logical address "L50" is also in the mapping table 400 and corresponds to the change command 712. In addition, the logical address "L23" is in the mapping table 400 and corresponds to the change command 711. If the command queue 710 has a change command corresponding to the first logical unit, then whether there is a read command in the command queue 710 sorted before the change command and also corresponding to the first logical unit is determined. For example, the read command 714 and the change command 711 both correspond to the logical unit of the logical address "L23", and the read command 714 is sorted before the change command 711. Moreover, there is no read command corresponding to the same logical unit before the modification command 712. If there is no read command in the command queue 710 also corresponding to the same logical unit and sorted before the change command, the sorting position of the command in the command queue 710 may be changed in advance; if the command queue 710 contains a read command also corresponding to the same logical unit and sorted before the change command, the sorting position of the command in the command queue 710 is not changed in advance. For example, here, the sorting position of the command 712 in the command queue 710 may be changed in advance, but the sorting position of the command 711 in the command queue 710 is not changed in advance. After the sorting position is changed, the command queue 720 is formed, wherein the sorting position of the change command 712 is advanced. Early execution of the change command 712 does not affect other read commands and there is a chance to release one physical unit.

After the host system 11 completes the host data consolidation process, the mapping table 400 is updated accordingly. For example, FIG. 8 shows a schematic diagram of an updated mapping table according to an embodiment. Referring to FIG. 8, in the present example, some physical units do not store valid data due to the execution of the above delete command or update command. Therefore, these physical units do not need to undergo subsequent device data consolidation process. For example, the mapping table 400 is divided into segments 801 to 803, wherein the physical unit in the segment 801 does not store valid data due to the execution of the update command. The physical units in the segment 802 do not store valid data due to the delete command. The host system 11 deletes the physical units (and corresponding logical units) in the segments 801 and 802 and leaves the segment 803, thereby updating the mapping table 400. Lastly, the host system 11 transmits the updated mapping table 400 back to the memory controller 103, that is, only transmits the segment 803 to the memory controller 103.

In an embodiment, the update command or the delete command issued by the host system 11 includes the mapping relationship between the logical unit and the physical unit. Therefore, after receiving such an update command or a delete command, the memory controller 103 may directly execute the corresponding operation without querying the logical-to-physical mapping table.

In an embodiment, in the remaining segment 803 of the mapping table 400, the sorting positions of the logical units (physical units) represent the order in which the logical units (physical units) are executed by the device data consolidation process. The host system 11 may adjust the order of the logical units (physical units) in the mapping table 400 according to the information therein. For example, the host system 11 may obtain the update frequency of the valid data in the source physical unit in the segment 803. For example, some data is updated once every minute, and some data is updated once every hour. The host system 11 may learn the update frequency of the valid data according to the information in the application process or the operating system running on the host system 11. Next, the host system 11 may adjust the sorting position of the source physical unit in the mapping table 400 according to the update frequency. For example, a logical unit (physical unit) having a lower update frequency is set at a higher priority sorting position, and a logical unit (physical unit) having a higher update frequency is set at a lower sorting position.

In an embodiment, the host system 11 may also be configured to execute the device data consolidation process only when the update frequency is less than or equal to a threshold. In other words, if the update frequency of the valid data of one source physical unit in the segment 803 is greater than the threshold, the host system 11 removes the source physical unit and the corresponding logical unit from the mapping table 400.

Referring to FIG. 3, after the host system 11 executes the system data consolidation process 306 and transmits the updated mapping table to the memory controller 103, in operation 307, the host system 11 issues an end host data consolidation command to the memory controller 103. The end host data consolidation command is used to instruct the memory controller 103 to stop transmitting the mapping table to the host system 11 and resume the device data consolidation process. After receiving the end host data consolidation command, the memory controller 103 stops transmitting the mapping table to the host system 11 and resumes the device data consolidation process. It is worth noting that if no host data consolidation command is received, the memory controller 103 continues to select source physical units, generates a mapping table, and then transmits the mapping table to the host system. That is, the operations 304 and 305 included in the process 310 and the host data consolidation process 306 are repeated continuously.

After resuming the device data consolidation process, the memory controller 103 executes the device data consolidation process according to the updated mapping table 400. That is, a source physical unit sorted earlier is selected from the updated mapping table, and the valid data therein is moved to the target physical unit, thereby releasing the source physical unit. In the above embodiment, the host system 11 sets the logical unit (physical unit) having a lower update frequency in a higher priority sorting position in the mapping table. Therefore, after receiving the updated mapping table 400, the memory controller 103 preferentially executes the device data consolidation process on the source physical unit having a lower update frequency. This may avoid the situation in which a piece of data is frequently updated and then the data consolidation process is executed, causing inefficient data movement.

In the above embodiment, the data consolidation process is initiated by the host system 11, but in other embodiments, the data consolidation process may also be initiated by the memory controller 103. For example, the memory controller 103 may determine the number of physical units in the spare area 22. If the number is too small, for example, less than a threshold, a command may be sent to the host system 11 to request the host system 11 to execute a host data consolidation process.

Figure 9:
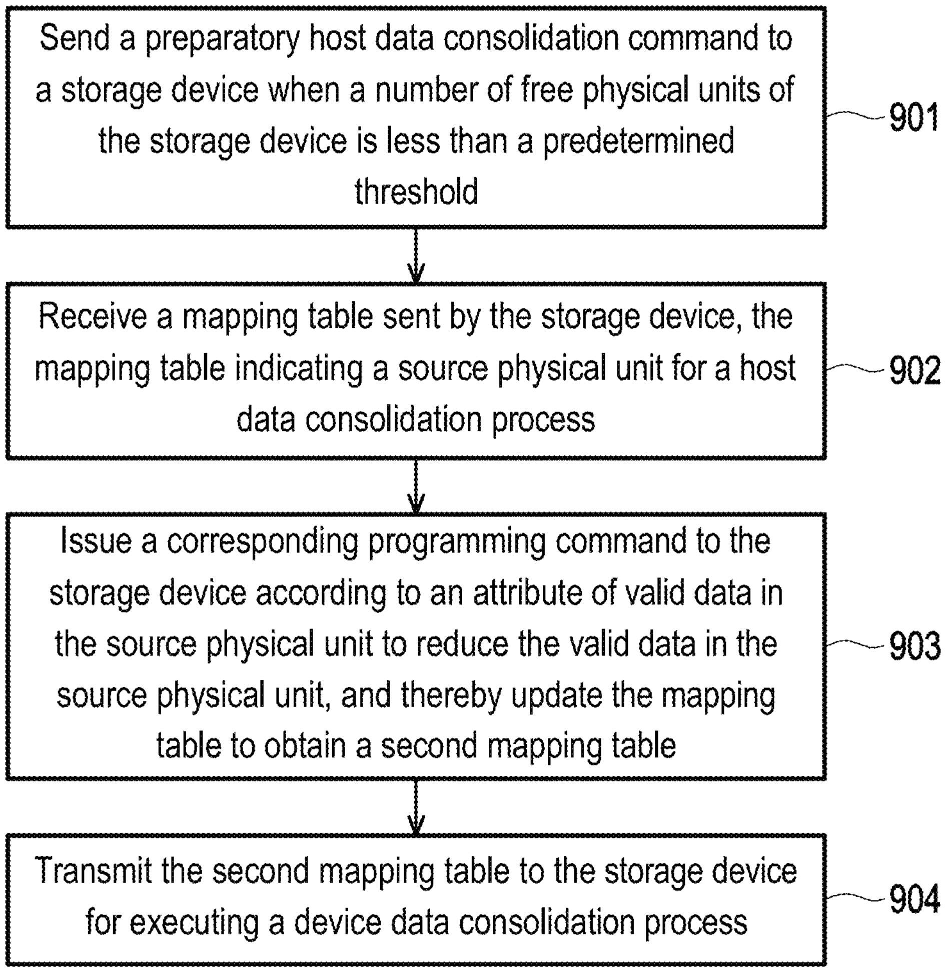
FIG. 9 shows a flowchart of a data management method for a host system according to an embodiment.

FIG. 9 is a flowchart of a data management method for a host system shown according to an embodiment. Referring to FIG. 9, steps 901 to 904 are executed by the host system 11. In step 901, when the number of free physical units of the storage device is less than a predetermined threshold, a preparatory host data consolidation command is sent to the storage device. In step 902, a mapping table sent by a storage device is received, and the mapping table indicates a source physical unit for a host data consolidation process. In step 903, according to the attribute of the valid data in the source physical unit, a corresponding programming command is issued to the storage device to reduce the valid data in the source physical unit, and thereby the mapping table is updated to obtain a second mapping table. In step 904, the resulting second mapping table is transmitted to the storage device for executing a device data consolidation process. The steps in FIG. 9 have been described in detail above and are not repeated here. Each step in FIG. 9 may be implemented as a circuit or a code, and the invention is not limited thereto. In addition, each step of FIG. 9 may be performed independently or in combination with the above embodiment. In other words, other steps may be added between, before, or after the steps in FIG. 9.

Figure 10:
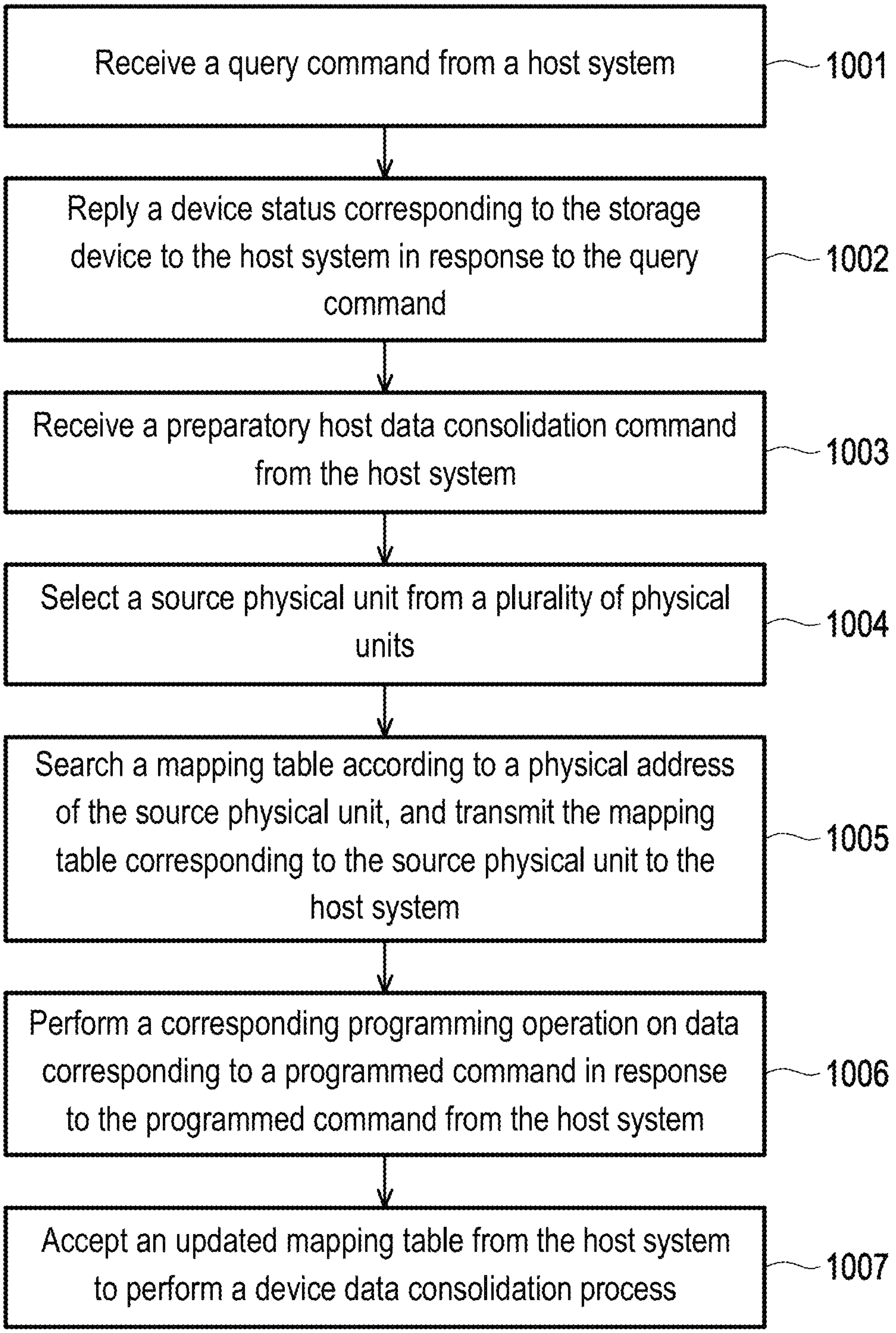
FIG. 10 shows a flowchart of a data management method for a storage device according to an embodiment.

FIG. 10 is a flowchart of a data management method for a storage device shown according to an embodiment. Referring to FIG. 10, steps 1001 to 1007 are executed by the memory controller 103. In step 1001, a query command is received from a host system. In step 1002, in response to a query command, a device status corresponding to the storage device is replied to the host system. In step 1003, a preparatory host data consolidation command from the host system is received. In step 1004, a source physical unit in a plurality of physical units is selected. In step 1005, a mapping table is searched according to the physical address of the source physical unit, and the mapping table corresponding to the source physical unit is transmitted to the host system. In step 1006, in response to the programming command from the host system, a corresponding programming operation is performed on the data corresponding to the programming command. In step 1007, the updated mapping table from the host system is received, thereby executing the device data consolidation process. The steps in FIG. 10 have been described in detail above and are not repeated here. Each step in FIG. 10 may be implemented as a circuit or a code, and the invention is not limited thereto. In addition, each step of FIG. 10 may be performed independently or in combination with the above embodiment. In other words, other steps may be added between, before, or after the steps in FIG. 10.

The data management method and the storage device provided above cooperate with the host system to execute the data consolidation process. The host system may flexibly execute the update command or the delete command according to the attribute of the valid data, or adjust the order of data consolidation according to the update frequency. This may avoid inefficient data movement and reduce write amplification. In addition, these practices also hand over some decisions to the host system. This may reduce the load on the storage device, for these reasons may improve the response speed, the performance, and the service life of the storage device, and may also more efficiently utilize the resources of the memory module.

Lastly, it should be noted that the above embodiments are used to describe the technical solution of the invention instead of limiting it. Although the invention has been described in detail with reference to each embodiment above, those having ordinary skill in the art should understand that the technical solution recited in each embodiment above may still be modified, or some or all of the technical features thereof may be equivalently replaced. These modifications or replacements do not make the essence of the corresponding technical solutions depart from the scope of the technical solution of each embodiment of the invention.

What is claimed is:

1. A data management method, for a host system, wherein the host system is electrically connected to a storage device, the storage device comprises a memory module, the memory module comprises a plurality of physical units, and the data management method comprises:

sending a preparatory host data consolidation command to the storage device when the number of free physical units of the storage device is less than a predetermined threshold;

receiving a mapping table sent by the storage device, the mapping table indicating a plurality of source physical units for a host data consolidation process;

issuing a corresponding programming command to the storage device according to an attribute of valid data in the source physical units to reduce the valid data in the source physical units, and thereby the mapping table is updated to obtain a second mapping table; and the second mapping table is transmitted to the storage device for executing a device data consolidation process.

2. The data management method of claim 1, further comprising:

sending a query command to the storage device at a preset frequency before sending the preparatory host data consolidation command to obtain a device status of the storage device; and receiving the device status from the storage device, wherein the device status comprises the number of free physical units of the storage device.

3. The data management method of claim 2, further comprising:

issuing an end host data consolidation command to the storage device by the host system after transmitting the second mapping table to the storage device, wherein the end host data consolidation command is configured to instruct the storage device to stop transmitting the mapping table to the host system and resume the device data consolidation process.

4. The data management method of claim 1, wherein the attribute indicates whether the valid data is periodically updated data, and the step of issuing the corresponding programming command to the storage device according to the attribute of the valid data in the source physical units comprises:

when the valid data is the periodically updated data, issuing an update command in advance to the storage device by the host system to update the valid data.

5. The data management method of claim 1, wherein the attribute indicates whether the valid data is deletable data, and the step of issuing the corresponding programming command to the storage device according to the attribute of the valid data in the source physical units by the host system comprises:

when the valid data is the deletable data, issuing a delete command to the storage device by the host system to delete the valid data.

6. The data management method of claim 1, wherein the step of issuing the corresponding programming command to the storage device according to the attribute of the valid data in the source physical units by the host system comprises:

determining whether a command queue of the host system comprises a change command corresponding to a first logical unit recorded in the mapping table, wherein the change command comprises an update command or a delete command;

determining whether there is a read command in the command queue sorted before the change command and corresponding to the first logical unit; and advancing a sorting position of the change command in the command queue in a case that there is no read command corresponding to the first logical unit in the command queue sorted before the change command.

7. The data management method of claim 1, further comprising:

obtaining an update frequency of the valid data in the source physical units; and adjusting sorting positions of the source physical units in the mapping table according to the update frequency, wherein the sorting position of the source physical units having a smaller update frequency is given higher priority.

8. The data management method of claim 7, further comprising:

removing a first source physical unit and a corresponding logical unit from the mapping table in a case that the update frequency of the valid data of the first source physical unit is greater than a threshold.

9. A data management method, for a storage device, wherein the storage device is electrically connected to a host system, the storage device comprises a memory module, the memory module comprises a plurality of physical units, and the data management method comprises:

selecting a plurality of source physical units in the plurality of physical units in response to a preparatory host data consolidation command of the host system;

searching a mapping table according to physical addresses of the source physical units, and transmitting the mapping table corresponding to the source physical units to the host system to execute a host data consolidation process;

performing a corresponding programming operation on data corresponding to a programming command from the host system; and after receiving an updated mapping table sent by the host system, a device data consolidation process is executed according to the updated mapping table.

10. The data management method of claim 9, further comprising:

receiving a query command from the host system;

sending a current device status to the host system in response to the query command, wherein the device status comprises a current number of free physical units.

11. The data management method of claim 9, further comprising:

not starting the device data consolidation process after receiving the preparatory host data consolidation command.

12. The data management method of claim 10, further comprising:

receiving an end host data consolidation command from the host system;

stopping a transmission of the mapping table to the host system and resuming the device data consolidation process in response to the end host data consolidation command.

13. The data management method of claim 9, wherein the step of receiving the updated mapping table from the host system and executing the device data consolidation process comprises:

executing the device data consolidation process according to sorting positions of the source physical units in the mapping table, wherein the source physical units having a smaller update frequency is preferentially executed with the device data consolidation process.

14. A storage device, comprising:

a connecting interface unit for connecting to a host system;

a memory module comprising a plurality of physical units; and a memory controller connected to the connecting interface unit and the memory module and used to perform a plurality of steps:

selecting a plurality of source physical units in the plurality of physical units in response to a preparatory host data consolidation command of the host system;

searching a mapping table according to physical addresses of the source physical units, and transmitting the mapping table corresponding to the source physical units to the host system to execute a host data consolidation process;

performing a corresponding programming operation on data corresponding to a programming command from the host system; wherein in response to the programming command being an update command, an update operation is performed on data corresponding to the update command, in response to the programming command being a delete command, a delete operation is performed on data corresponding to the delete command; and after receiving an updated mapping table sent by the host system, a device data consolidation process is executed according to the updated mapping table.

15. The storage device of claim 14, wherein the plurality of steps further comprise:

receiving a query command from the host system;

sending a current device status to the host system in response to the query command, wherein the device status comprises a current number of free physical units.

16. The storage device of claim 14, wherein the plurality of steps further comprise:

not starting the device data consolidation process after receiving the preparatory host data consolidation command.

17. The storage device of claim 14, wherein the plurality of steps further comprise:

receiving an end host data consolidation command from the host system; and stopping a transmission of the mapping table to the host system and resuming the device data consolidation process after receiving the end host data consolidation command.

18. The storage device of claim 14, wherein the step of accepting the updated mapping table from the host system and executing the device data consolidation process comprises:

executing the device data consolidation process according to a sorting position of the source physical units in the mapping table, wherein the source physical unit having a smaller update frequency is preferentially executed with the device data consolidation process.

* * * * *